2,860,162
PROCESS OF OXIDATION

Bo Thuresson af Ekenstam, Bofors, Sweden, assignor to Aktiebolaget Bofors, Bofors, Sweden, a corporation of Sweden No Drawing. Application June 2, 1951
Serial No. 229,655

Claims priority, application Sweden June 12, 1950

15 Claims. (Cl. 260—507)

This invention relates to a method of oxidizing cyclic compounds having one or more side chains; and in particular is directed to the oxidation of such compounds by nitric acid, either alone or in combination with other oxidizing agents, under pressure. The invention is directed especially to the oxidation of the aforementioned cyclic compounds which are soluble in a moderate amount of water or nitric acid, the solubility thereof being due to the presence in the molecule of one or more hydrophilic groups, so that the oxidation takes place in a homogeneous liquid phase.

In accordance with the principles of this invention the compound to be oxidized is completely dissolved in water or nitric acid. The concentrations of the compound and the nitric acid (including additional oxidizing agents, if any are employed), are so adjusted that the reaction, at the subsequent elevated temperature, takes place practically instantaneously under an increase of pressure of from 5 to 50 kilograms/square centimeter, with an attendant elevation of temperature.

In carrying out the process of this invention the oxidant or oxidants are used in almost stoichiometrical amounts with respect to the compound that is to be oxidized. In general, the oxidants are completely consumed during the reaction. Furthermore, the process lends itself to processing wherein the oxidation is carried out in either partial or continuous operations.

In carrying out the process of this invention where the compounds to be oxidized are characterized by the presence of acid groups linked directly or indirectly to the ring, such compounds may be used in the form of their alkali metal or alkaline earth metal derivatives. Where the compounds to be oxidized contain a tertiary nitrogen atom, the salts of such basic compounds with appropriate acids may be used as the starting materials. An advantage of such procedure resides in the fact, inter alia, that the ultimate salts of the newly produced carboxylic acids can quite readily be isolated from the mother liquor.

As starting materials which may be oxidized in accordance with the process of this invention there are: Sulfinic and sulfonic acids and compounds containing a tertiary nitrogen atom, either as a constituent of the cyclic nucleus or as a unit that is directly, or indirectly, attached to the nucleus. Such compounds are especially suitable for oxidation by the method of this invention, as well as derivatives of such compounds. Other compounds which also may be oxidized by the method of this invention are those containing, in the molecule, one or more halogen atoms, nitro-groups, phenyl-groups, phenyl-alkyl-groups, and carboxyl groups.

It has also been discovered that the oxidation can be carried out or facilitated by the use of other oxidants in combination with the nitric acid or as a partial replacement thereof, as for example, by the addition of air, oxygen, nitrates, nitrites, or nitrogen oxides. It also is to be noted the reaction temperatures of this process can be depressed by adding suitable oxidation catalysts.

In general, the compounds which may be oxidized in accordance with this invention may be designated or defined as cyclic compounds containing at least one nuclearly attached carbon containing group. The compounds also contain, as has been stated above, one or more hydrophilic groups either directly or indirectly attached to the ring, or a tertiary nitrogen atom either as a constituent of the ring or linked directly or indirectly thereto. Thus, hydrophilic cyclic compounds having at least one nuclearly attached carbon containing group are typified by toluene sulfonic acid, xylene sulfonic acid, napthalene sulfonic acid, etc. In the case of napthalene sulfonic acid the carbon containing group is fused in the 1-2 position to the ring or nucleus that carries the $SO_3H$ group.

Within that definition of the compounds there are also included, as stated above, the derivatives of the compounds, such as those having halogen, nitro, phenyl, phenyl alkyl, carboxyl, and other substituents linked to the nucleus.

In most instances the products resulting from the oxidation are those wherein the carbon containing groups attached to the hydrophilized nucleus are oxidized to carboxyl groups. In the case of the picolines, as for example, $\beta$-picoline, the nucleus is ruptured and the products of the oxidation are a mixture of aliphatic carboxylic acids.

The reaction velocity, the reaction equilibrium, the pressure and the temperature of the oxidations carried out by the process of this invention can readily be controlled by appropriate adjustments of the concentrations of the oxidizing agents in the homogeneous solutions in suitable relation to the compounds which are to be oxidized. Such appropriate concentrations can easily be determined by suitable tests in the laboratory.

Accordingly this invention, in its fundamental aspects, arises from the discovery that it is possible to oxidize to carboxylic acids, cyclic compounds having at least one nuclearly attached carbon containing group as defined above by forming a homogeneous solution of the said compound and nitric acid (including other oxidants and/or catalysts, if desired), maintaining the said solution in a closed zone, elevating the temperature of the solution to initiate the oxidation reaction, and allowing the oxidation then to proceed to completion at high velocity with the development of superatmospheric pressure.

The following are examples of oxidation carried out in accordance with the process of this invention:

Example 1

172 parts of para-toluene sulfonic acid, 300 parts of water and 200 parts of 65% nitric acid are placed in an acid-resistant steel pressure vessel under stirring, and the solution heated to 145° C. The oxidation of the para-toluene sulfonic acid to para-sulfobenzoic acid takes place within a few minutes under a great rise in temperature. The oxidation product can be isolated from the mother liquor. By adding potassium chloride, the oxidation product can be isolated from the mother liquor in high yield, as a slightly soluble sulfonate. Some 2-nitro-4-sulfobenzoic acid is also formed during the oxidation, from which the para-sulfobenzoic acid can very easily be purified by the common purifying methods.

Example 2

300 parts of ortho-toluene sulfonic acid and a stoichiometrical quantity of 30% nitric acid are placed in an acid-resistant pressure vessel as described in Example 1. The temperature is raised to 145° C. At this temperature, the reaction proceeds within a few minutes under a great rise of the temperature and a maximum pressure of 40 kilograms/square centimeter. The ortho-sulfobenzoic acid formed can be transferred by pressure from the pressure vessel into a homogeneous water solution, and can be isolated from the mother liquor as a calcium salt in high yield.

*Example 3*

172 parts of ortho-toluolsulfonic acid, 110 parts of potassium nitrate, 300 parts of water, and 100 parts of 65% nitric acid are heated to 160° C. in an acid-resistant pressure vessel. At the said temperature, a rapid oxidation to ortho-sulfobenzoic acid occurs. The potassium salt of the acid can be isolated direct from the mother liquor at a yield of 80% by cooling and salting.

*Example 4*

172 parts of ortho-toluenesulfonic acid, 85 parts of potassium nitrite, 300 parts of water and 160 parts of 65% nitric acid are placed in an acid-resistant pressure vessel and heated to 145° C. A rapid rise of the pressure owing to the nitrous gases formed by the formation of sulfonate is to be observed. At the said temperature the oxidation occurs rapidly under a rise of the temperature and a further rise of the pressure to 45 kilograms/square centimeter. The potassium salt of the ortho-sulfobenzoic acid is to be isolated as in Example 3.

*Example 5*

172 parts of ortho-toluenesulfonic acid, 50 parts of 65% nitric acid and 300 parts of water are mixed in an acid-resistant pressure vessel provided with an intake for gas. The mixture is heated to 220° C. At the said temperature, oxygen is led into the mixture at a pressure of 40 kilograms/square centimeter. A visible consumption of oxygen can be established and ortho-sulfobenzoic acid in high yield can be isolated from the mother liquor by neutralizing and salting with potassium chloride.

*Example 6*

93 parts of meta-xylenesulfonic acid (2,4-dimethyl benzene sulfonic acid), 200 parts of 65% nitric acid and 300 parts of water are placed in a pressure vessel of steel. The mixture is heated to 130° C. At the said temperature a rapid rise of the pressure shows a quickly occurring oxidation under a further rise of the temperature to 185° C. 4-sulfoisophthalic acid can be isolated from the mother liquor in a way mentioned in the foregoing examples.

*Example 7*

52 parts of β-naphthalenesulfonic acid together with 200 parts of 65% nitric acid and 300 parts of water are placed in a pressure vessel and heated to 170° C. At the said temperature a slow rise of the pressure shows that an oxidation takes place, more slowly however, than the reaction indicated in the examples given in the foregoing. 4-sulfophthalic acid can be isolated from the mother liquor from the oxidation.

*Example 8*

In a pressure vessel, a mixture containing 93 parts of β-picoline, 290 parts of 65% nitric acid and 300 parts of water is heated to 180° C. The formation of nitrous gases and a considerable rise of the pressure shows that an oxidation takes place at the said temperature. Contrary to the examples of oxidations previously mentioned, a break of the ring is obtained in this case, as the products of the oxidation prove to consist of different aliphatic carboxylic acids.

I claim:

1. Method of oxidizing a hydrophilic cyclic compound having at least one nuclearly attached carbon containing group to form a carboxylic acid which comprises the following steps: (a) forming a solution comprising said compound and nitric acid, (b) maintaining the said solution in a closed zone, (c) elevating the temperature of the solution to initiate the oxidation reaction, and (d) allowing the oxidation to proceed to completion at (i) high velocity and (ii) under superatmospheric pressure.

2. Method in accordance with claim 1 wherein step (c) is 120°–300° C.

3. Method in accordance with claim 1 wherein the pressure of step [(c)(ii)] is 5–50 atmospheres.

4. Method in accordance with claim 1 including other oxidants substituted in part for the nitric acid in step (a).

5. Method in accordance with claim 1, characterized by the continuous addition to the reaction mixture of nitric acid having a strength of at least 25%.

6. Method in accordance with claim 1 wherein the nitric acid employed in step (a) is dilute nitric acid having a concentration of from 5% to 20%.

7. Method in accordance with claim 1 wherein the nitric acid employed in step (a) is dilute nitric acid having a concentration of about 15%.

8. Method in accordance with claim 1 wherein the compound of step (a) is characterized by the presence of nuclearly attached substituents in addition to oxidizable carbon containing groups attached to said nucleus.

9. Method of oxidizing cyclic sulfonic acids having at least one carbon chain attached to the cyclic nucleus to a carboxylic cyclic sulfonic acid which comprises forming a solution comprising said compound and nitric acid, maintaining said solution in a closed zone, elevating the temperature of the solution to initiate the oxidation reaction, and allowing the oxidation to proceed to completion to form a sulfocarboxylic acid.

10. Method in accordance with claim 9 wherein ortho-toluene sulfonic acid is oxidized to ortho-sulfobenzoic acid.

11. Method in accordance with claim 9 wherein para toluene sulfonic acid is oxidized to para sulfobenzoic acid.

12. Method in accordance with claim 9 wherein meta xylene sulfonic acid is oxidized to 4-sulfoisophthalic acid.

13. Method in accordance with claim 1 wherein β-naphthalene sulfonic acid is oxidized to 4-sulfophthalic acid.

14. Method in accordance with claim 1 wherein β-picoline is oxidized to aliphatic carboxylic acids.

15. Method of oxidizing a toluene sulfonic acid to form a sulfobenzoic acid which comprises the following steps: (a) forming a solution comprising said toluene sulfonic acid and nitric acid, (b) maintaining the said solution in a closed zone, (c) elevating the temperature of the solution to initiate the oxidation reaction, and (d) allowing the oxidation to proceed to completion at (i) high velocity and (ii) under superatmospheric pressure.

References Cited in the file of this patent

UNITED STATES PATENTS

| | | |
|---|---|---|
| 1,332,028 | Coblentz et al. | Feb. 24, 1920 |
| 1,488,730 | Beall et al. | Apr. 1, 1924 |
| 2,559,147 | Emerson et al. | July 3, 1951 |

FOREIGN PATENTS

| | | |
|---|---|---|
| 10,810 | Great Britain | of 1897 |
| 216,091 | Germany | Nov. 22, 1909 |
| 876,196 | France | Oct. 29, 1942 |
| 494,439 | Belgium | Mar. 31, 1950 |

OTHER REFERENCES

Koelsch: "Org. Syntheses," vol. 26, pp. 95–6 (1946).
Legge: J. Am. Chem. Soc., vol. 69, pp. 2086–90 (1947).